Feb. 26, 1924.                                                          1,484,847
                              C. A. RIVERS ET AL
                              EXTENSION PEDAL
                        Original Filed Jan. 3, 1919
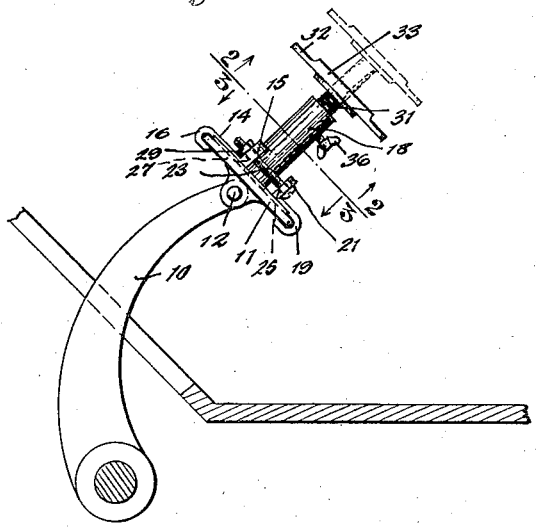
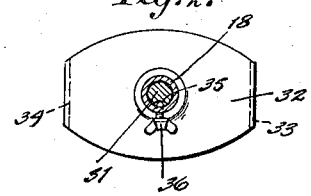
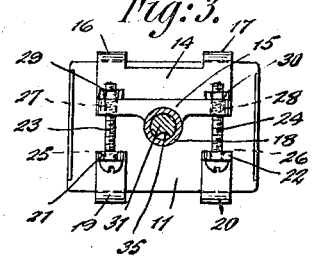
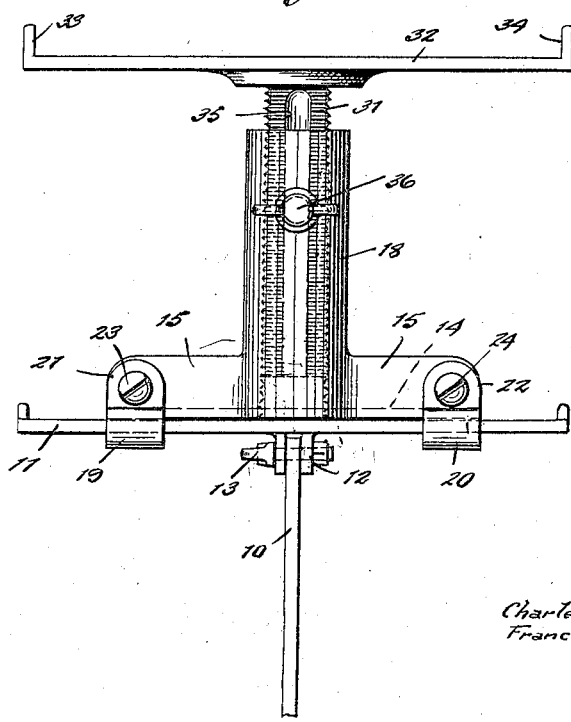
INVENTORS
Charles A. Rivers and
Francis B. Stuart
BY C. P. Goepel
ATTORNEY Patented Feb. 26, 1924.

1,484,847

UNITED STATES PATENT OFFICE.

CHARLES A. RIVERS AND FRANCIS B. STUART, OF EL PASO, TEXAS; ARA M. RIVERS ADMINISTRATRIX OF SAID CHARLES A. RIVERS, DECEASED.

EXTENSION PEDAL.

Application filed January 3, 1919, Serial No. 269,488. Renewed January 30, 1922. Serial No. 532,900.

*To all whom it may concern:*

Be it known that we, CHARLES A. RIVERS and FRANCIS B. STUART, both citizens of the United States, and residents of El Paso, in the county of El Paso and State of Texas, have invented certain new and useful Improvements in Extension Pedals, of which the following is a specification.

The present invention relates to improvements in extension pedals, particularly for use in connection with vehicle control pedals, an object of the invention being to provide such a device which will be simple and durable in construction, may be readily attached to any of the numerous shapes or sizes of pedals used upon vehicles, and may be readily and quickly adjusted to the desired height, and when so adjusted may be rigidly fixed relatively to the main pedal.

With these and other objects in view an embodiment of our invention is shown in the accompanying drawings and this embodiment will be hereinafter more fully described with reference thereto and the invention will be finally pointed out in the appended claims.

In the accompanying drawings:

Fig. 1 is a fragmentary longitudinal sectional view through the floor of an automobile showing the clutch pedal with an embodiment of our invention in place thereon;

Fig. 2 is a horizontal sectional view taken along the line 2—2 of Fig. 1;

Fig. 3 is a similar view taken along the line 3—3 of Fig. 1; and

Fig. 4 is a front elevation of the extension pedal according to the present embodiment, in place upon the clutch pedal.

Similar reference characters indicate corresponding parts throughout the several figures of the drawings.

Referring to the drawings the conventional vehicle control pedal 10 is provided with a head 11 adjustable about the pivot 12 and adapted to be fixed in any desired position of adjustment by tightening of the winged nut 13. To this head 11 our extension pedal is attached, and comprises a base plate 14 having an upstanding face portion 15 and provided at its rear with spaced hook portions 16 and 17 adapted to be engaged over the rear edge of the head 11.

Centrally of the base portion 15 there is provided an upstanding tubular post 18 interiorly screw-threaded, the bore of which may be extended entirely therethrough as shown, or it may if desired be closed at its lower end. The base 14, the face portion 15 and the post are preferably cast in one piece, the face portion which extends along the sides of the post constituting a strengthening support therefor, in addition to its other functions which will be presently described.

A pair of spaced hooks 19 and 20 provided with upstanding portions 21 and 22 are adapted to be engaged about the front edge of the head 11, these hooks being opposed in their position to the hook portions 16 and 17, and connected to the face portion 15 by bolts 23 and 24 passing through holes 25 and 26 in the said upstanding portions, the said face portion being provided with threaded holes 27 and 28 into which the bolts are screwed the heads of the bolts engaging the front surface of the upstanding portions of the hooks 19 and 20. Thus by tightening the bolts the plate 14 is securely fastened to the head, the spaced relation of the hook portions enabling the same to be engaged with any of the usual shapes or sizes of pedal heads, as, for instance, rectangular or oval. Retaining nuts 29 and 30 adapted to be tightened against the rear surface of the face portion 15 are provided upon the ends of the bolts 23 and 24.

A threaded shank 31 having threads of relatively low pitch is engaged in the threaded bore of the post 18 and at its upper end is provided with an extension pedal head 32. This head may be of any suitable form, that is, it may have the flanges 33 and 34, and its upper surface may be serrated or provided with a rubber insert or other device to provide a friction surface for engagement by the foot. The head 32 is non-rotatable relatively to the shank 31. By turning the head and shank the head may be brought to any desired position of adjustment relatively to the head 11 of the clutch pedal, the low pitch of the threads permitting a very fine degree of adjustment.

The shank is provided with a longitudinal groove or slot 35 adapted to be engaged by a set screw 36 provided in the post 18, and when engaged the head 32 is prevented from turning. When it is desired to adjust the position of the head 32 the set screw is disengaged from the groove 35, and thereupon the turning of the head and its adjustment is permitted.

In addition to the adjustment as to height along an axis perpendicular to the plane of the pedal 11, the extension pedal may be adjusted angularly by means of the pivot connection 12. The post 18 interposed between the head 11 and the head 34 being substantially in line with the pedal 10 it forms a direct support against the force exerted upon the pedal during operation of the same.

Our improved extension pedal is of simple and durable construction, may be adjusted to suit any need, and will not in any way impair the functioning of the vehicle control pedal to which it is attached.

We have illustrated and described preferred and satisfactory embodiments of our invention but it is obvious that changes may be made therein within the spirit and scope thereof as defined in the appended claims.

We claim:

1. In combination with a pedal, a base plate removably fitted thereon and having means for gripping the pedal at one edge, a tubular post rising from the base plate in substantial alinement with the axial line of thrust of the pedal and having means to reinforce the lower end of the tubular post, said means extending laterally of the post, gripping means engageable with an opposite edge of the pedal and having contractable means for drawing the gripping means against the pedal edge, said gripping means engaging the post reinforcing means at opposite sides of the post, an extension pedal head having a shank connected thereto and axially movable through said tubular post to accomplish the adjustment of said extension pedal, and means whereby the shank may be held against rotation in the tubular post and incidentally against axial movement.

2. In combination with a pedal, a base plate adapted to be placed thereon and having means to grip a portion of the pedal, a tubular interiorly threaded post held by the base plate and extending substantially perpendicular with respect to the plane of the pedal face and having its lower end engageable with a central portion of the pedal, said base plate having reinforcing means passing in front of the post and joined therewith at the lower front portion and laterally thereof, gripping means engageable with an opposite portion of the pedal, contractile means for drawing the gripping means on the base plate and the last-mentioned gripping means together, said contractile means engaging with the portions of the reinforcing means at opposite sides of the post, an extension pedal, a threaded stem therefor connected thereto and engageable in the interiorly threaded post whereby rotation of the stem may result in the axial adjustment of the same and the extension pedal, and means whereby the threaded stem may be locked against rotation in the tubular post.

3. In combination with a pedal, a base plate adapted to lie flat against the upper face of the pedal and having claws to engage an edge of the pedal, said plate having a laterally-extending reinforcing web rising from the rear edge thereof, a tubular post threaded interiorly and having its lower end merging with the base plate and central portion of the reinforcing web and lying rearwardly of the web, claws engaging with an opposite edge of the pedal, contractile means connected between the last-named claws and the end portions of the web to opposite sides of the post, an extension pedal, a threaded stem connected therewith and having a longitudinal slot therein, said stem having a low pitch and threaded into said post, and means entering through the post and into the slot in said stem to prevent rotation thereof.

4. In combination with an automobile pedal having an oscillating movement about a transverse shaft, a plate lying flat against the upper face of the pedal and having means to removably secure the same in place thereon, a tubular post interiorly threaded and reinforced at its base rising from the plate at a central portion of the pedal, a threaded stem entering the post and adjustable axially therethrough, means to lock the stem against rotation, and an extension pedal carried by the stem but non-rotatable therewith.

5. In combination with a pedal, a base plate provided with inturned members adapted to engage a margin of said pedal and with a threaded tubular post, and a base bar reinforcing the lower portion of said post intermediate the ends of said bar, separate inturned members adapted to engage a margin of said pedal, means adjustably connecting said separate members with the ends of said base bar, and an auxiliary pedal vertically adjustable on said post.

6. In combination with a pedal, a base plate provided with clamping members adapted to engage a margin of said pedal, a threaded tubular post extending vertically from said base plate, and a base bar reinforcing the lower portion of said post intermediate the ends of said bar, separate inturned members adapted to engage a margin of said pedal, adjustable means engaging said separate members and the ends of said base bar, an auxiliary pedal provided with a threaded shank engaging said post and provided with a longitudinal groove, and means connected with said post adapted to hold said shank against rotation in said post.

In testimony that they claim the foregoing as their invention, they have signed their names hereunder.

CHARLES A. RIVERS.
FRANCIS B. STUART.